(12) United States Patent
Isen et al.

(10) Patent No.: US 11,860,787 B2
(45) Date of Patent: Jan. 2, 2024

(54) CACHE MISS PREDICTOR

(71) Applicant: Advanced Micro Devices, Inc., Santa Clara, CA (US)

(72) Inventors: Ciji Isen, Austin, TX (US); Paul J. Moyer, Fort Collins, CO (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/490,739

(22) Filed: Sep. 30, 2021

(65) Prior Publication Data

US 2023/0108964 A1 Apr. 6, 2023

(51) Int. Cl.
*G06F 12/08* (2016.01)
*G06F 12/0811* (2016.01)
*G06F 12/0862* (2016.01)
*G06F 12/02* (2006.01)

(52) U.S. Cl.
CPC ...... *G06F 12/0811* (2013.01); *G06F 12/0238* (2013.01); *G06F 12/0292* (2013.01); *G06F 12/0862* (2013.01); *G06F 2212/1021* (2013.01)

(58) Field of Classification Search
CPC ............ G06F 12/0811; G06F 12/0862; G06F 12/0292; G06F 2212/1021; G06F 12/0238
USPC ........................................................ 711/154
See application file for complete search history.

(56) References Cited

U.S. PATENT DOCUMENTS

| | | | |
|---|---|---|---|
| 2012/0284463 A1* | 11/2012 | Srinivasan | G06F 9/3851 711/E12.017 |
| 2013/0246708 A1 | 9/2013 | Ono et al. | |
| 2014/0143502 A1 | 5/2014 | Loh et al. | |
| 2014/0297965 A1 | 10/2014 | Jayaseelan et al. | |
| 2016/0092235 A1* | 3/2016 | Gonzalez-Alberquilla | G06F 9/3824 712/220 |
| 2021/0034527 A1* | 2/2021 | Klingauf | G06F 12/0877 |
| 2022/0100666 A1* | 3/2022 | Ishii | G06F 12/0891 |

FOREIGN PATENT DOCUMENTS

KR 10-2009-0061959 A 6/2009

* cited by examiner

*Primary Examiner* — Hua J Song
(74) *Attorney, Agent, or Firm* — Volpe Koenig

(57) ABSTRACT

Methods, devices, and systems for retrieving information based on cache miss prediction. A prediction that a cache lookup for the information will miss a cache is made based on a history table. The cache lookup for the information is performed based on the request. A main memory fetch for the information is begun before the cache lookup completes, based on the prediction that the cache lookup for the information will miss the cache. In some implementations, the prediction includes comparing a first set of bits stored in the history table with a second set of bits stored in the history table. In some implementations, the prediction includes comparing at least a portion of an address of the request for the information with a set of bits in the history table.

20 Claims, 4 Drawing Sheets

CACHE MISS PREDICTOR

BACKGROUND

Computer systems include memory devices which store information for use by a processing device. Computer systems usually include several types of memory with different capabilities, such as processor registers, cache memory, and main memory. The different types of memory are typically organized in a memory hierarchy based on access latency or other suitable metrics. The memory hierarchy may include processor registers, cache memory, and main memory. Other devices, such as hard disk drives and tape backup drives, are also included in the memory hierarchy in some implementations, although such devices are often referred to as storage devices rather than memory devices. Access latency refers to the time between a request for the information from the memory and the access being completed, e.g., either by the return of the requested data or of an indication that the information is not stored in the memory.

Devices at the top of the memory hierarchy, such as processor registers, have the fastest access time in the system and are the most immediately available for access (e.g., are powered on and/or are organized for more immediate access), but typically have smaller storage capacity and/or are more expensive (e.g., in terms of power consumption and/or die area cost). Devices lower in the memory hierarchy have slower access time and/or are less immediately available for access, but typically have larger storage capacity and/or are less expensive. The processing unit typically only has direct access to devices at the top of the memory hierarchy (e.g., processor registers).

More frequently used information is stored in higher levels of the memory hierarchy, and less frequently used information is stored in lower levels. If information that is required for a computation by the processor is not present in the top of the memory hierarchy, it is retrieved from the next lower level of the hierarchy and stored in the top of the memory hierarchy. For example, if a certain piece of information that is needed for a calculation is not present in a processor register, it is fetched from a cache memory. If the information is also not available in the next lower level of the hierarchy, it is fetched from a further lower level (e.g., a lower level cache, or system memory). The time used to determine whether information is available in a particular level of the memory hierarchy and to retrieve it from a lower level of the memory hierarchy impacts the performance of the computer system contributing to access latency.

BRIEF DESCRIPTION OF THE DRAWINGS

A more detailed understanding can be had from the following description, given by way of example in conjunction with the accompanying drawings wherein.

DETAILED DESCRIPTION

Figure 1:
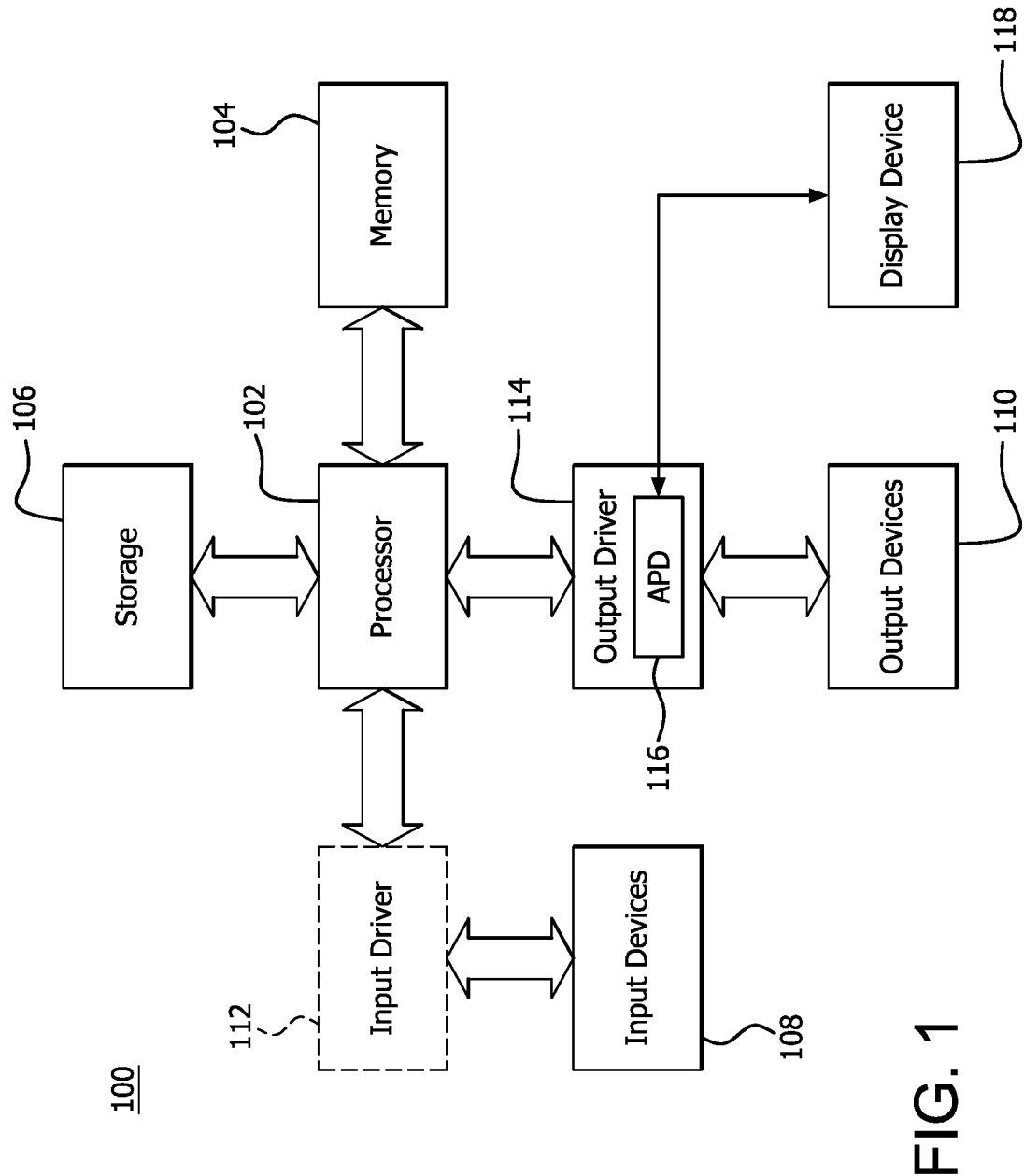
FIG. 1 is a block diagram of an example device in which one or more features of the disclosure can be implemented.

Some implementations provide a method for retrieving information based on cache miss prediction. A prediction that a cache lookup for the information will miss a cache is made based on a history table. The cache lookup for the information is performed based on the request. A main memory fetch for the information is begun before the cache lookup completes, based on the prediction that the cache lookup for the information will miss the cache.

In some implementations, the prediction, based on the history table, that the cache lookup for the information will miss the cache includes comparing a first set of bits stored in the history table with a second set of bits stored in the history table. In some implementations, a resolution of the history table corresponds to a number of bits tracking a history of cache misses. In some implementations, the resolution of the history table is adjusted based on an amount of available memory bandwidth. In some implementations, the resolution of the history table is adjusted responsive to the cache lookup for the information hitting the cache. In some implementations, the history table tracks a history of cache misses per core, per source type, or per thread.

In some implementations, the prediction, based on the history table, that the cache lookup for the information will miss the cache includes comparing at least a portion of an address of the request for the information with a set of bits in the history table. In some implementations, a resolution of the history table corresponds to a number of bits including the set of bits in the history table. In some implementations, the resolution of the history table is adjusted based on an amount of available memory bandwidth. In some implementations, the resolution of the history table is adjusted responsive to predicting that the request for the information will miss the cache and to detecting a corresponding cache hit that does not match the prediction.

Some implementations provide a processor configured to retrieve information based on cache miss prediction. The processor includes circuitry configured to receive a request for information. The processor also includes circuitry configured to predict, based on a history table, that a cache lookup for the information will miss a cache. The processor also includes circuitry configured to perform the cache lookup for the information based on the request. The processor also includes circuitry configured to begin a main memory fetch for the information before the cache lookup completes, based on the prediction that the cache lookup for the information will miss the cache.

In some implementations the circuitry configured to predict, based on a history table, that a cache lookup for the information will miss a cache includes circuitry configured to compare a first set of bits stored in the history table with a second set of bits stored in the history table. In some implementations a resolution of the history table corresponds to a number of bits tracking a history of cache misses. In some implementations the processor includes circuitry configured to adjust the resolution of the history table based on an amount of available memory bandwidth. In some implementations the processor includes circuitry configured to adjust the resolution of the history table responsive to the cache lookup for the information hitting the cache. In some implementations the history table tracks a history of cache misses per core, per source type, or per thread.

In some implementations the circuitry configured to predict, based on the history table, that the cache lookup for the information will miss the cache includes circuitry configured to compare at least a portion of an address of the request for the information with a set of bits in the history table. In some implementations a resolution of the history table corresponds to a number of bits including the set of bits in the history table. In some implementations, the processor includes circuitry configured to adjust the resolution of the history table based on an available memory bandwidth. In some implementations, the processor includes circuitry configured to adjust the resolution of the history table responsive to predicting that the request for the information will miss the cache and to detection of a corresponding cache hit that does not match the prediction.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the processor 102 includes registers and one or more levels of cache memory. In various alternatives, the processor 102 includes a memory controller and/or other circuitry configured to manage a memory hierarchy, which includes the registers, cache memory, and memory 104. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. In various alternatives, storage 106 is also part of the memory hierarchy. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a SIMD paradigm may perform the functionality described herein. Alternatively, it is contemplated that computing systems that do not perform processing tasks in accordance with a SIMD paradigm can also perform the functionality described herein.

If a processor, memory controller, or other hardware requests information from a level of the memory hierarchy and the information is available at that level, the request can be referred to as a hit. If the information is not available at that level, the request can be referred to as a miss.

In an example computing system, if a processor executes an instruction to load a certain piece of information into a processor register, the memory system determines whether the information is available at the next level of the memory hierarchy, such as a top level or L0 cache. In some implementations, the determination is made by a memory controller or other suitable hardware. If the information is not available in the top-level cache, the instruction can be said to miss the top level cache. In this circumstance, the memory system will typically perform a lookup in the next lower level of the memory hierarchy (e.g., an L1 cache) to determine whether the information is available there. This lookup may also hit or miss, and the process may continue down the memory hierarchy until the information is found and ultimately loaded into the processor register.

As the memory system proceeds to search down the memory hierarchy for the requested information, the lookup at each level typically becomes slower and slower due to the increasing access latency in lower levels of the memory hierarchy.

For example, in a memory hierarchy which includes four levels of cache (L0, L1, L2, and L3 caches) above a main memory (e.g., DRAM) level, there may be significant differences in access latency between the different levels. In some implementations, the difference in access latency may be due to the significantly larger size of the next lower level cache, the longer wireline distance to the main memory, and/or increased complexity in accessing the main memory, etc.

Because the access latency of the next lower level in the memory hierarchy may be significant, in some cases it is advantageous to begin the lookup of the next lower level before the current level returns a hit or miss. In an example, upon an L2 cache miss, it is typically necessary to perform a relatively slow L3 cache lookup. Because the L3 cache lookup is slow, and because a main memory (DRAM in this example) lookup (e.g., main memory fetch) is slower still, in some implementations, a DRAM lookup is performed in parallel with the L3 cache lookup. In some implementations, the parallel DRAM lookup is begun at the same time as the L3 cache lookup, or begun before the end of the L3 cache lookup. If the L3 cache lookup misses, the parallel DRAM lookup returns its result sooner than if the memory system had waited for the L3 miss before beginning the DRAM lookup. The parallel DRAM lookup is ignored, terminated, and/or discarded, etc., if the L3 cache hits. This parallel lookup is conceptually possible between other levels of a memory hierarchy, such as performing both L2 and L3 lookups in parallel in response to an L1 cache miss, or performing both DRAM and hard disk lookups in parallel in response to an L3 cache miss. Further parallelism is also conceptually possible, such as performing parallel L3, DRAM, and hard disk lookups in response to an L2 cache miss.

In some implementations, launching a parallel lookup of two or more lower levels of the memory hierarchy comes at a cost to communications bandwidth. For example, main memory typically communicates with a processor (and on-chip caches) over a memory bus. The memory bus is a shared electrical connection. In some implementations, the memory bus transfers information between different modules of the main memory and different processors over the same memory bus. Thus, a potentially unnecessary main memory fetch (e.g., DRAM lookup) upon an L2 cache miss can have the effect of reducing the amount of memory bus bandwidth available for communications by other processors, DRAM modules, etc. Analogous bandwidth costs would also apply to other memory communications, such as on-chip interconnect between cache memories and processor registers, or between a backing store and multiple computer systems, etc. Thus, in some implementations, whether and which parallel lookups are used at a particular level of the memory hierarchy depend on factors such as a balance of improved access latency, design cost, complexity, and/or memory bandwidth.

In some implementations, miss prediction is used to reduce, minimize, or otherwise manage the memory bandwidth penalty in performing parallel lookups. For example, in some implementations, if it is predicted to be likely that the L3 will miss on a given L2 miss, a parallel DRAM lookup is performed, whereas the parallel DRAM lookup is not performed if it is predicted that the L3 will not miss.

Some implementations provide cache miss prediction based on tracking a history of hit and miss, or by tracking address space proximity. In some implementations, the hit and miss history or address space proximity history is tracked using a variable number of bits. In some implementations, the number of bits is adjusted based on feedback. In some implementations, the feedback relates to the accuracy of past predictions and/or available memory bandwidth. In some implementations, the number of bits is adjusted based on the accuracy of past predictions and/or available memory bandwidth.

In some implementations, miss prediction is based on tracking hit and miss history of a cache, and can be referred to as temporal prediction. For example, in some implementations, temporal prediction is based on a past history of cache lookups.

In some implementations, miss prediction is based on tracking hit and miss history of a memory region, and can be referred to as spatial prediction. For example, in some implementations, spatial prediction is based on tracking whether a hit or miss occurred for data stored in a same region (e.g., within a given address range) of memory or cache memory.

In some implementations, prediction is based on a combination of temporal and spatial prediction. The prediction is carried out by circuitry configured to predict whether a request misses (or hits) the cache (or other memory).

In some implementations, temporal miss prediction circuitry (miss predictors herein) track hit-or-miss history and determine recurring patterns in the history. If a recurring pattern is detected, a prediction is made as to whether the next cache lookup will hit or miss based on the pattern.

In some implementations, temporal miss predictors track hit-or-miss history on a per-thread basis. In such implementations, a history of cache hits and misses is recorded for each particular thread. If a recurring pattern is detected, a prediction is made as to whether the next cache lookup by that thread will hit or miss based on the pattern. Tracking cache hits/misses per-thread can improve prediction.

In some implementations, temporal miss predictors track hit-or-miss history on a per-source basis. In this context, a "source" is the source of a request or "lookup" for information, stored in a location. Cache memory, and/or other memory is queried for the information based on the request from the source. For example, cache lookup requests may be made from different sources or types/classes of sources (e.g., a code request, data request, translation lookaside buffer (TLB lookup), prefetch, etc.) In some implementations, a history of cache hits and misses is recorded for each particular source. Tracking cache hits/misses based on source, type, and/or class can improve prediction.

In some implementations, temporal miss predictors track hit-or-miss history on both a per-source and per-thread basis. For example, each thread may receive cache lookup requests from different sources or types/classes of sources (e.g., a code request, data request, TLB, prefetch, etc.) Tracking cache hits/misses for each thread based on source class can improve prediction.

In some implementations, temporal miss predictors track hit-or-miss history on other bases, such as on a per-core basis.

In the following example, cache hits/misses are tracked using an 8-bit history. For each request, the hit or miss result is stored as the most significant bit, after the bits of the history are shifted down the remaining bits. The most significant 4 bits are compared to the least significant 4 bits to determine whether they match, indicating a repeated pattern. A prediction about whether the next request will hit or miss the cache is made based on whether or not a match (i.e., a repeated pattern) is detected. In some implementations, more than one group of the history is comparable to detect patterns. For example, in a case where history is tracked with 9 bits (e.g., 8-0), the most significant three bits (8-6) are compared with the least significant three bits (2-0) and also the middle significant bits (5-3) and a pattern is indicated where all three groups match. In some implementations, this can have the advantage of yielding a higher confidence prediction.

Table 1 shows an 8-bit history for a temporal miss predictor which tracks hit-or-miss (indicated by H or M respectively) history on a per-core and per-thread basis, for a single source type.

TABLE 1

| 7 | 6 | 5 | 4 | 3 | 2 | 1 | 0 | (Bit Number - 8 bit history) |
|---|---|---|---|---|---|---|---|---|
| H | M | H | M | H | M | H | M | Core 0 Thread 0 / Source Type |
| H | H | M | H | H | H | M | H | Core 0 Thread 1 / Source Type |
| H | M | H | H | M | M | M | M | Core 1 Thread 0 / Source Type |
|   |   |   |   |   |   |   |   | ... |
|   |   |   |   |   |   |   |   | Core X Thread Y / Source Type |

In this example, the most recent cache lookup by the source type for thread 0 on core 0 was a hit, as indicated by an H in the most significant bit 7, in the leftmost column. Comparing the most significant 4 bits to the least significant bits indicates a repeating pattern. In this example, the H M H M pattern of bits 7-4 matches the H M H M pattern of bits 3-0. In some implementations, the next cache lookup by the source type for thread 0 on core 0 is predicted to be a miss, based on the 4-bit repeating pattern that is detected. Thus, in some implementations, a parallel lookup to a lower level of the cache or to DRAM is performed based on the prediction that it will miss. In some implementations the decision involves other factors, such as available memory bandwidth, and so forth, as further discussed herein for example.

As shown in the second line of Table 1, the most recent cache lookup by the source type for thread 1 on core 0 was a hit, as indicated by an H in the most significant bit 7, in the leftmost column. Comparing the most significant 4 bits to the least significant bits indicates a repeated pattern of hits and misses. In this example, the HHMH pattern of bits 7-4 matches the HHMH pattern of bits 3-0. In some implementations, the next cache lookup by the source type for thread 1 on core 0 is predicted to be a hit, based on the 4-bit repeating pattern that is detected. Thus, in some implementations, a parallel lookup to a lower level of the cache or to DRAM is not performed based on the prediction that it will hit. In some implementations the decision involves other factors, such as available memory bandwidth, and so forth, as further discussed herein for example.

As shown in the third line of Table 1, the most recent cache lookup by the source type for thread 0 on core 1 was a hit, as indicated by an H in the most significant bit 7, in the leftmost column. Comparing the most significant 4 bits to the least significant bits indicates that there is no detected repeating pattern. In this example, the H M H H pattern of bits 7-4 does not match the M M M M pattern of bits 3-0. In some implementations, the next cache lookup by the source type for thread 0 on core 1 is not predicted, based on the absence of a detected repeating pattern. Thus, in some implementations, whether or not a parallel lookup to a lower level of the cache or to DRAM is performed is based on other factors, such as default setting, available memory bandwidth, and/or other factors, and so forth, as further discussed herein for example. In some implementations, a default to launch a parallel lookup or not where no repeating pattern is detected is selectable (e.g., as an implementation choice, or a tuning parameter, etc.)

The number of bits used to track the history, or resolution of the history, can be considered an indication of the accuracy of the prediction. For example, in some implementations the number of bits used to track the history relates to a level of confidence in the prediction. Here, more history tracking bits will yield a higher resolution match, and a stronger confidence that a miss prediction based on a repeated pattern (or absence of a repeated pattern) will be accurate. Fewer history tracking bits will yield a lower resolution match, and a weaker confidence that a miss prediction based on a repeated pattern (or absence of a repeated pattern) will be accurate. Accordingly, the accuracy of the prediction, and accordingly, the reliability of the miss prediction, can be increased or relaxed based on the number of bits used to store the history. For example, using 8 bits to track the hit and miss history will produce a higher resolution and potentially more accurate prediction than using 2 bits to track the hit and miss history.

In some implementations, the resolution of the prediction is adjustable based on available bandwidth (e.g., memory bandwidth). Prediction resolution is adjusted based on memory bandwidth for the examples herein, however it is noted that in some implementations the resolution of the prediction is adjustable based on other bandwidth (e.g., interconnect bandwidth) in addiction to or instead of memory bandwidth. For example, if available memory bandwidth is relatively plentiful (e.g., is high enough to allow for a parallel lookup without impacting other memory traffic, or without delaying other memory traffic more than a threshold amount), a repetition within 2 bits provides a sufficiently accurate miss prediction in some circumstances, since the memory bandwidth cost of an incorrect prediction is relatively lower. In other words, launching an unnecessary parallel lookup (e.g., of DRAM) by incorrectly predicting a miss would cause a relatively lower performance penalty if there is enough bandwidth to handle the parallel lookup without delaying (or overly delaying) other memory traffic.

On the other hand, if the available memory bandwidth is relatively scarce, in some implementations it is preferable to base the miss prediction on a repeated pattern over a greater number of bits in order to provide a more accurate miss prediction. In some implementations, basing the miss prediction on a greater number of history tracking bits can have the advantage of reducing or avoiding unnecessary DRAM lookups. In other words, increasing the number of traffic history bits can have the advantage of reducing delays to other memory traffic by reducing the chance of inaccurately predicting a lookup miss.

In some implementations, increasing the number of history bits used for prediction can have the advantage of increasing prediction accuracy. In some implementations, increasing the number of history bits used for prediction can have the disadvantage of missing detection of some patterns which are mixed with other patterns. In some implementations, increasing the number of history bits used for prediction can have the disadvantage of taking longer to detect patterns, e.g., where the history buffer takes longer to fill due to its increased size.

Figure 2:
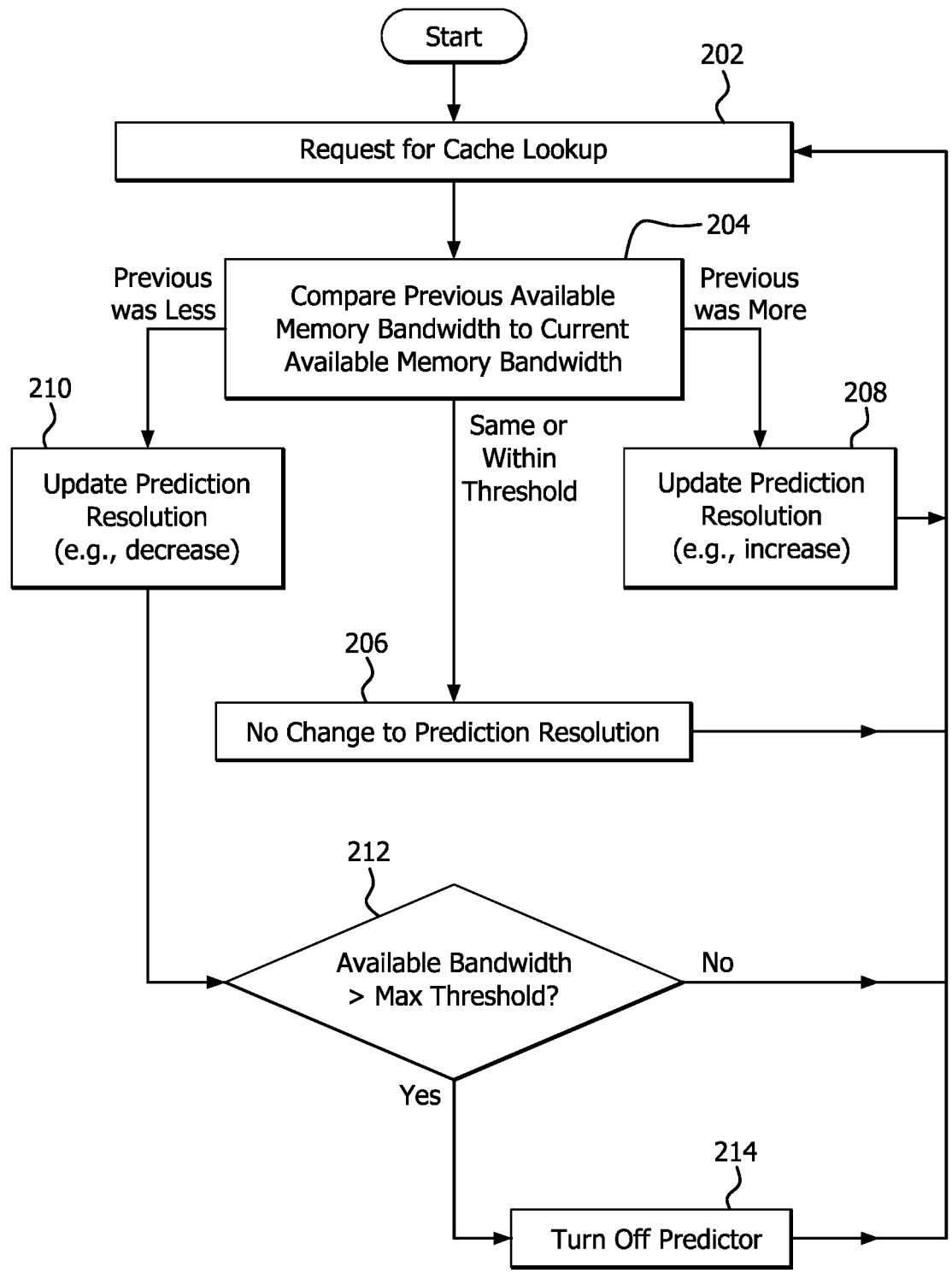
FIG. 2 is a flow chart illustrating example adjustment of history tracking resolution based on available memory bandwidth.

FIG. 2 is a flow chart illustrating example adjustment of history tracking resolution based on available memory bandwidth.

In step 202, the memory system receives a request for a cache lookup. In some implementations, the memory system receives the request from a source, such as a code request, data request, TLB, prefetch, etc. In some implementations, the memory system includes a memory controller which receives the request.

In step 204, the memory system compares the currently available memory bandwidth with the memory bandwidth that was available following a previous request for a cache lookup. In some implementations, the comparison is done by a component other than the memory system.

If the currently available memory bandwidth is the same as (or within a threshold amount as) the available memory bandwidth following a previous request for a cache lookup (i.e., whether there has been no change in the available memory bandwidth, or any change is within a threshold amount), the history tracking resolution is not changed at step 206, and the flow returns to step 202 for the next cache lookup.

If the available memory bandwidth following a previous request for a cache lookup was greater (or greater by more than a threshold amount) than the currently available memory bandwidth (i.e., whether there has been a decrease in the available memory bandwidth, or a decrease by more than a threshold amount), the history tracking resolution is increased (e.g., changed from 2 bits to 8 bits) at step 208, and the flow returns to step 202 for the next cache lookup.

If the available memory bandwidth following a previous request for a cache lookup was less (or less by more than a threshold amount) than the currently available memory bandwidth (i.e., whether there has been an increase in the available memory bandwidth, or an increase by more than a threshold amount), the history tracking resolution is decreased (e.g., changed from 8 bits to 2 bits) at step 210. In some implementations, the flow returns to step 202 for the next cache lookup, however in this example, on a condition 212 that the current available bandwidth exceeds a maximum threshold, the predictor is turned off in step 214 before the flow returns to step 202, and on a condition 212 that the current available bandwidth does not exceed the maximum threshold, the flow returns directly to step 202. In such implementations, miss prediction is considered to be unnecessary if the memory bandwidth is above the threshold and a parallel lookup is launched on every cache lookup, since there is enough bandwidth to handle the parallel lookup without delaying (or overly delaying) other memory traffic.

In some implementations, the resolution of the prediction is also or alternatively adjustable based on feedback. For example, if a request for a cache (or other memory) lookup is received by the memory system (e.g., a memory controller), a prediction of whether the cache lookup will miss is made based on the current history. After the lookup is eventually complete, the actual result is compared with the prediction. This comparison is used as feedback to the prediction history. In other words, the resolution of the history (e.g., number of bits) is adjustable based on the feedback in some implementations. For example, if the miss prediction was incorrect, more bits can be used for future predictions, and vice versa.

Figure 3:
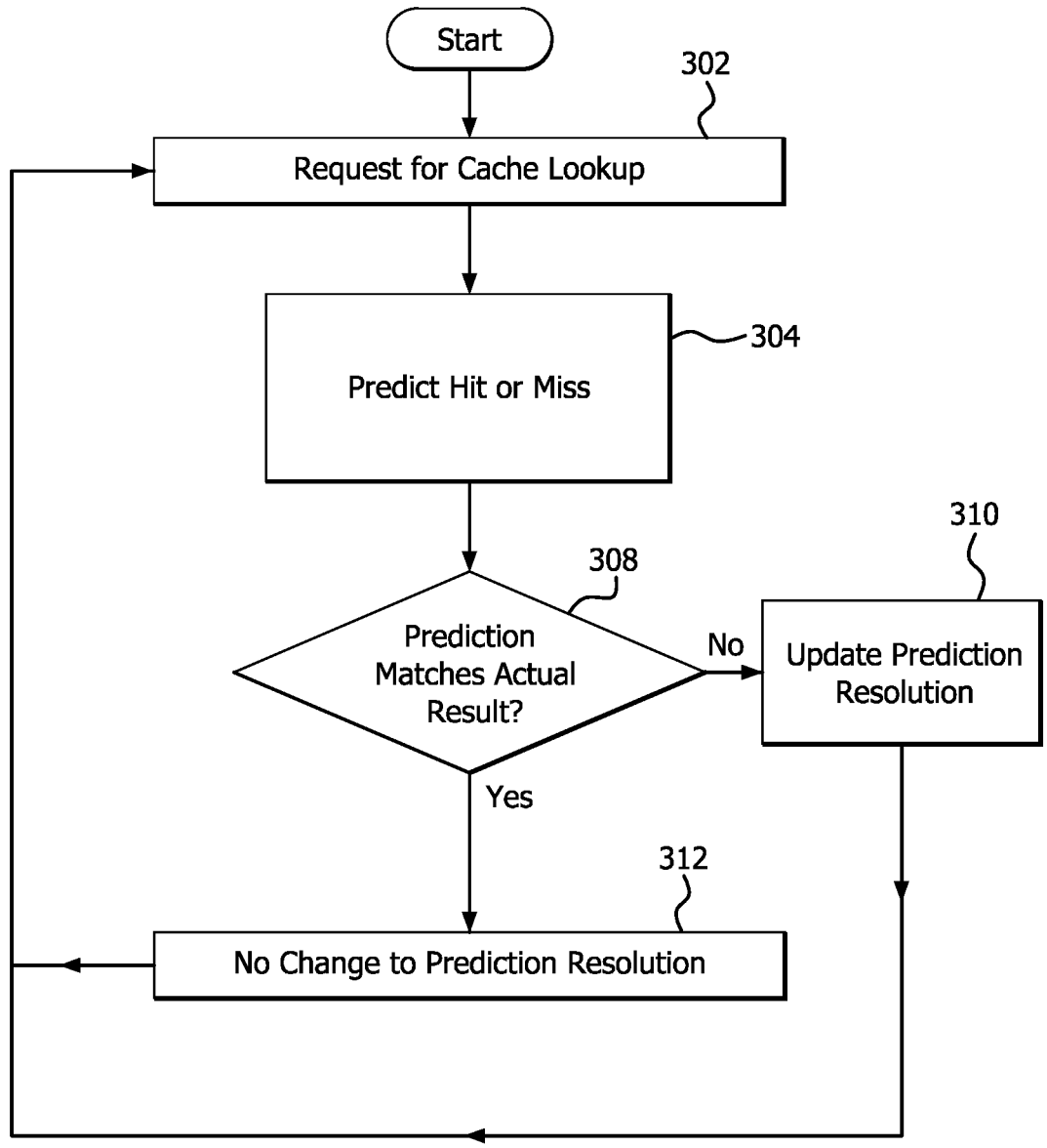
FIG. 3 is a flow chart illustrating example adjustment of history tracking resolution based on feedback.

FIG. 3 is a flow chart illustrating example adjustment of history tracking resolution based on feedback.

In step 302, the memory system receives a request for a cache or other memory lookup. In some implementations, the memory system receives the lookup request from a source, such as a code request, data request, TLB, prefetch, etc. In some implementations, the memory system includes a memory controller which receives the request.

In step 304, the prediction circuitry generates a prediction of whether the request hits or misses the cache. On condition 308 that the predictor incorrectly predicts whether the request hits or misses the cache (i.e., the prediction does not match the actual result), the tracking history resolution is updated (e.g., the number of bits is increased) in step 310. On condition 308 that the predictor correctly predicts whether the request hits or misses the cache (i.e., the prediction matches the actual result), the tracking history resolution is not updated (e.g., the number of bits remains the same) as indicated by box 312. In either case, the flow returns to step 302 for the next cache lookup. In some implementations, tracking history resolution is updated in step 310 on a condition that the prediction of a miss is incorrect a threshold number of times.

Some implementations provide cache miss prediction based on whether a hit or miss was made in a same region of memory. For example, for a L2 cache lookup, the requested memory address is compared to a history of L3 misses within a range of addresses of the requested memory address. Similar to the Temporal Predictor above, a history is maintained for each L3 lookup, however the tracking stores past miss addresses, rather than past hit or miss results. For example, if a lookup request is for an address on the same memory page as an address which missed the L3 cache, and that is stored in the history, the request may be predicted to miss the L3 cache.

Table 2 shows a history for an example spatial miss predictor which tracks memory addresses that missed the L3 cache.

TABLE 2

Example 8-bit history for spatial prediction

| Address History | Thread ID | Source Type |
|---|---|---|
| 0x FAB12345 . . . | TID 0 | DC |
| 0x CAFEBB8 . . . | TID 0 | DC |
| 0x CODEB123 . . . | TID 0 | IC |
| . . . | . . . | . . . |
| 0x DEADBOB . . . | TID X | TLB |

In this example, the history is also tracked on a per-thread and per-source basis, illustrating the combinability of these concepts with spatial prediction. Here, the history reflects that at least one lookup request for a memory addresses beginning with the most significant 32 bits 0x FAB12345 missed the L3 cache. It is also indicated that this memory request was for thread 0 (indicated by thread identifier TID) and came from a data cache (DC). Likewise, historical cache misses for memory addresses beginning with the most significant bits 0x CAFEBB8, 0x CODEB123 (from an instruction cache (ICC)), and 0x DEADBOB (from a translation lookaside buffer (TLB)) are also recorded in the history.

In some implementations, a cache lookup for a memory address within a given range of a recorded miss address is predicted to miss. In some implementations, the miss depends on the cache lookup coming from the same source type, or the same thread, core, etc. In some implementations, the prediction resolution is defined by a number of bits. For example, if the resolution is defined as 16 bits, a lookup request to an address having the same 16 most significant bits as an address in the history that missed the same cache is predicted to also miss the cache. The spatial predictor also stores a certain number of addresses. This number can be referred to as the depth of the predictor.

The resolution of the spatial predictor is adjustable by changing the number of most significant bits used for comparison. For example, if the resolution is changed from 16 to 256 bits, the prediction is for addresses within a smaller range of addresses from the missed address stored in the spatial prediction history, and is considered to be stricter or more accurate in some implementations. The resolution and/or depth of the spatial predictor are also adjustable dynamically similarly to the temporal predictor discussed above. For example, the prediction may be set to be stricter if available memory bandwidth is below a threshold or decreases, and vice versa.

In some implementations, spatial predictors track hit-or-miss history on a per-thread basis. In such implementations, a history of cache hits and misses is recorded for each particular thread. If a recurring pattern is detected, a prediction is made as to whether the next cache lookup by that thread will hit or miss based on the pattern. Tracking cache hits/misses per-thread can improve prediction.

In some implementations, spatial miss predictors track hit-or-miss history on a per-source basis. For example, cache lookup requests may be made from different sources or types/classes of sources (e.g., a code request, data request, TLB, prefetch, etc.) In some implementations, a history of cache hits and misses is recorded for each particular source. Tracking cache hits/misses based on source, type, and/or class can improve prediction.

In some implementations, spatial miss predictors track hit-or-miss history on both a per-source and per-thread basis. For example, each thread may receive cache lookup requests from different sources or types/classes of sources (e.g., a code request, data request, TLB, prefetch, etc.) Tracking cache hits/misses for each thread based on source class can improve prediction.

The spatial and temporal predictors are combinable. For example, some implementations track both a history of hits and misses, and a history of missed addresses, and the hit or miss prediction is made based on both the spatial and temporal prediction.

Figure 4:
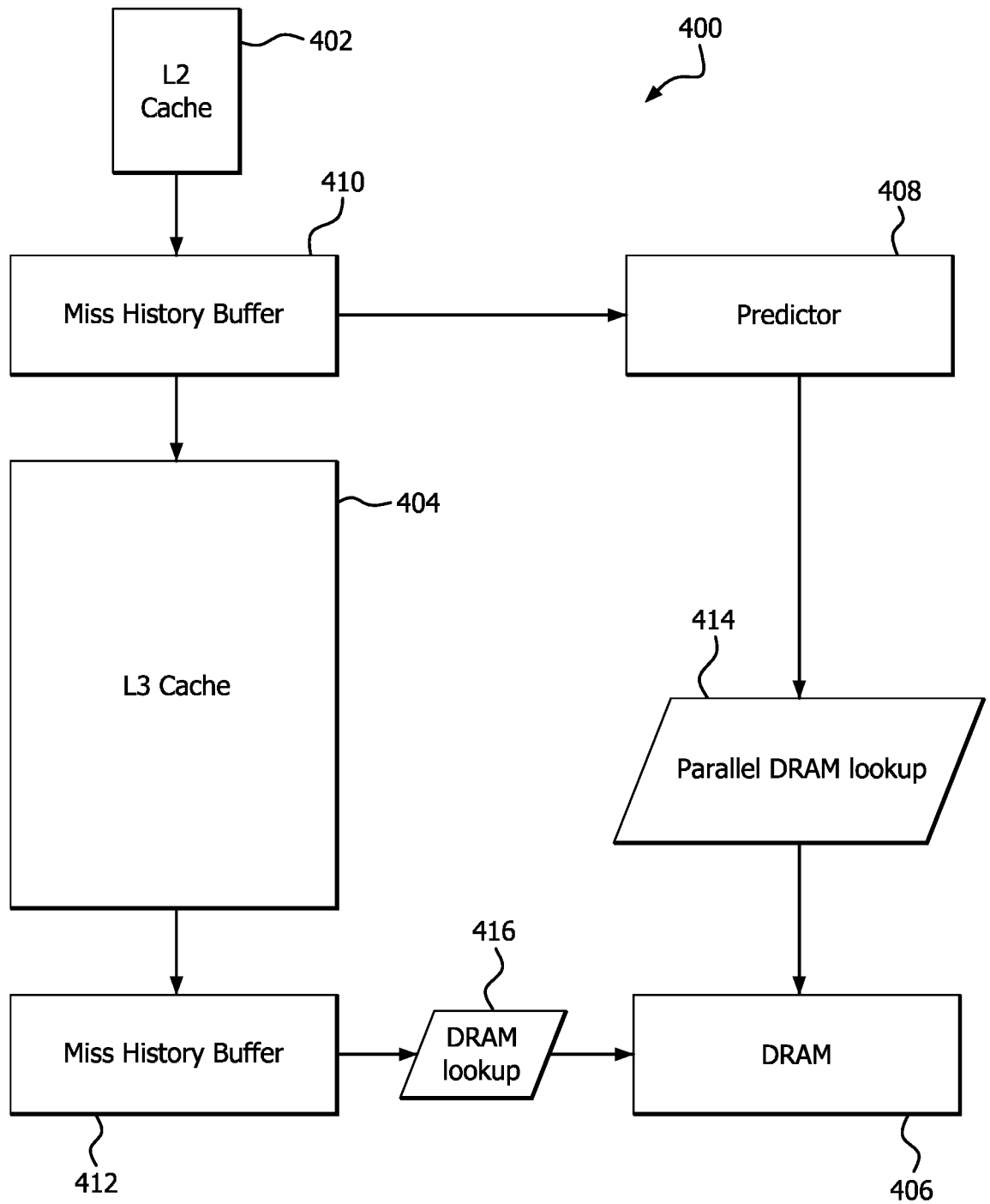
FIG. 4 is a block diagram illustrating an example portion of a memory system.

FIG. 4 is a block diagram illustrating an example portion of a memory system 400. The memory hierarchy of memory system 400 includes L2 cache 402, L3 cache 404, and DRAM 406. The memory system 400 also includes a miss predictor 408 and miss history buffers 410 and 412.

In this example, if an information request to L2 cache 402 misses, the L2 cache miss is recorded in miss history buffer 410, and miss predictor 408 predicts (or does not predict) whether a request for the information will also miss the L3 cache.

If predictor 408 predicts an L3 cache miss, it launches a parallel lookup 414 for the information in DRAM 406.

If predictor 408 predicts that the request will hit the L3 cache, or does not make a prediction, parallel lookup 414 of DRAM 406 is not launched.

In either case, if the request misses L3 cache 404, the L3 cache miss is recorded in miss history buffer 412, and a DRAM lookup 416 for the information is sent to DRAM 406. If the L3 cache miss was predicted by predictor 408, the information (or indication of a DRAM miss) will be available sooner than if the miss was not predicted by predictor 408, due to the earlier parallel DRAM lookup 414. In either case, DRAM 406 returns the information, or a DRAM miss indication, to L3 Cache 404.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for retrieving information based on cache miss prediction, the method comprising:
   receiving a request for information;
   predicting, based on a history table, that a cache lookup for the information will miss a cache, wherein the history table tracks a history of cache misses on a per-thread and a per-source basis, where the request is associated with a source;
   performing the cache lookup for the information based on the request; and
   fetching from main memory for the information before the cache lookup completes, based on the prediction that the cache lookup for the information will miss the cache.

2. The method of claim 1, wherein predicting, based on the history table, that the cache lookup for the information will miss the cache comprises comparing a first set of bits stored in the history table with a second set of bits stored in the history table.

3. The method of claim 1, wherein a resolution of the history table corresponds to a number of bits tracking a history of cache misses.

4. The method of claim 3, further comprising adjusting the resolution of the history table based on an amount of available memory bandwidth.

5. The method of claim 3, further comprising adjusting the resolution of the history table responsive to the cache lookup for the information hitting the cache.

6. The method of claim 1, wherein the fetching of the information from the main memory completes after the cache lookup completes.

7. The method of claim 1, wherein predicting, based on the history table, that the cache lookup for the information will miss the cache comprises comparing at least a portion of an address of the request for the information with a set of bits in the history table.

8. The method of claim 7, wherein a resolution of the history table corresponds to a number of bits comprising the set of bits in the history table.

9. The method of claim 8, further comprising adjusting the resolution of the history table based on an amount of available memory bandwidth.

10. The method of claim 8, further comprising adjusting the resolution of the history table responsive to predicting that the request for the information will miss the cache and to detecting a corresponding cache hit that does not match the prediction.

11. A processor configured to retrieve information based on cache miss prediction, the processor comprising:
   circuitry configured to receive a request for information;
   circuitry configured to predict, based on a history table, that a cache lookup for the information will miss a cache, wherein the history table tracks a history of cache on a per-thread and a per-source basis, where the request is associated with a source;

circuitry configured to perform the cache lookup for the information based on the request; and circuitry configured to fetch from main memory for the information before the cache lookup completes, based on the prediction that the cache lookup for the information will miss the cache.

12. The processor of claim 11, wherein circuitry configured to predict, based on the history table, that the cache lookup for the information will miss a cache comprises circuitry configured to compare a first set of bits stored in the history table with a second set of bits stored in the history table.

13. The processor of claim 11, wherein a resolution of the history table corresponds to a number of bits tracking a history of cache misses.

14. The processor of claim 13, further comprising circuitry configured to adjust the resolution of the history table based on an amount of available memory bandwidth.

15. The processor of claim 13, further comprising circuitry configured to adjust the resolution of the history table responsive to the cache lookup for the information hitting the cache.

16. The processor of claim 11, wherein the fetch from the main memory for the information completes after the cache lookup completes.

17. The processor of claim 11, wherein the circuitry configured to predict, based on the history table, that the cache lookup for the information will miss the cache comprises circuitry configured to compare at least a portion of an address of the request for the information with a set of bits in the history table.

18. The processor of claim 17, wherein a resolution of the history table corresponds to a number of bits comprising the set of bits in the history table.

19. The processor of claim 18, further comprising circuitry configured to adjust the resolution of the history table based on an amount of available memory bandwidth.

20. The processor of claim 18, further comprising circuitry configured to adjust the resolution of the history table responsive to predicting that the request for the information will miss the cache and to detection of a corresponding cache hit that does not match the prediction.

\* \* \* \* \*